(12) United States Patent
Durham et al.

(10) Patent No.: US 9,276,745 B2
(45) Date of Patent: Mar. 1, 2016

(54) PRESERVING IMAGE PRIVACY WHEN MANIPULATED BY CLOUD SERVICES

(75) Inventors: David M. Durham, Beaverton, OR (US); Men Long, Beaverton, OR (US); Karanvir S. Grewal, Hillsboro, OR (US); Prashant Dewan, Hillsboro, OR (US); Xiaozhu Kang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 13/976,298

(22) PCT Filed: Dec. 15, 2011

(86) PCT No.: PCT/US2011/065284
§ 371 (c)(1),
(2), (4) Date: Jun. 26, 2013

(87) PCT Pub. No.: WO2013/089758
PCT Pub. Date: Jun. 20, 2013

(65) Prior Publication Data
US 2013/0279690 A1    Oct. 24, 2013

(51) Int. Cl.
*H04L 29/06* (2006.01)
*G06F 21/10* (2013.01)
(Continued)

(52) U.S. Cl.
CPC .............. *H04L 9/28* (2013.01); *G06F 21/6263* (2013.01); *H04L 9/065* (2013.01); *H04L 63/0428* (2013.01); *H04N 1/4486* (2013.01); *H04N 21/2743* (2013.01); *H04N 21/4405* (2013.01); *H04N 21/4408* (2013.01); *H04N 21/4788* (2013.01); *H04N 21/8153* (2013.01); *G06F 2221/2107* (2013.01)

(58) Field of Classification Search
None
See application file for complete search history.

(56) References Cited

U.S. PATENT DOCUMENTS 6,560,339 B1 * 5/2003 Iwamura ................. 380/201
2003/0235325 A1  12/2003 Ray et al.
(Continued)

FOREIGN PATENT DOCUMENTS

EP    1187483 A2    3/2002
EP    1906332 A2    4/2008

OTHER PUBLICATIONS

International Search Report and Written Opinion, Aug. 27, 2012, 9 pages, International Application No. PCT/US2011/065284, Korean International Patent Office, Metropolitan City, Korea.
(Continued)

*Primary Examiner* — Michael R Vaughan
(74) *Attorney, Agent, or Firm* — Marger Johnson

(57) ABSTRACT

An apparatus and method for preserving image privacy when manipulated by cloud services includes middleware for receiving an original image, splitting the original image into two sub-images, where the RGB pixel values of the sub-images have a bit value that is less than RGB pixel values of the original image. The sub-images are encrypted by adding a keystream to the RGB pixel values of the sub-images. The sub-image data is transmitted to a cloud service such as a social network or photo-sharing site, which manipulate the images by resizing, cropping, filtering, or the like. The sub-image data is received by the middleware and is successfully decrypted irrespective of the manipulations performed by the cloud services. In an alternative embodiment, the blocks of the original image are permutated when encrypted, and then reverse-permutated when decrypted.

18 Claims, 10 Drawing Sheets

(51) Int. Cl.
*H04L 9/28* (2006.01)
*H04L 9/06* (2006.01)
*H04N 1/44* (2006.01)
*G06F 21/62* (2013.01)
*H04N 21/2743* (2011.01)
*H04N 21/4405* (2011.01)
*H04N 21/4408* (2011.01)
*H04N 21/4788* (2011.01)
*H04N 21/81* (2011.01)

(56) References Cited

U.S. PATENT DOCUMENTS

| | | |
|---|---|---|
| 2004/0081334 A1 | 4/2004 | Hayashi |
| 2004/0141613 A1 | 7/2004 | Hayashi |
| 2006/0026428 A1* | 2/2006 | Schrijen ................. G06F 21/60 713/171 |
| 2006/0045309 A1 | 3/2006 | Suthaharan |
| 2009/0220076 A1* | 9/2009 | Kuraki et al. .................... 380/54 |
| 2010/0034380 A1* | 2/2010 | Lee ................. 380/243 |
| 2010/0046750 A1* | 2/2010 | Asfour .................... G03H 1/00 380/54 |
| 2010/0074443 A1* | 3/2010 | Ishii et al. ..................... 380/243 |
| 2011/0197056 A1 | 8/2011 | Chen |
| 2011/0222687 A1 | 9/2011 | Mori |
| 2013/0251143 A1* | 9/2013 | Nakagata et al. ............... 380/28 |
| 2013/0305383 A1* | 11/2013 | Garralda et al. ................. 726/26 |

OTHER PUBLICATIONS

European Patent Office, Extended European Search Report, Application No. 11877297.9, Jul. 15, 2015, 6 pages, Munich, Germany.

* cited by examiner

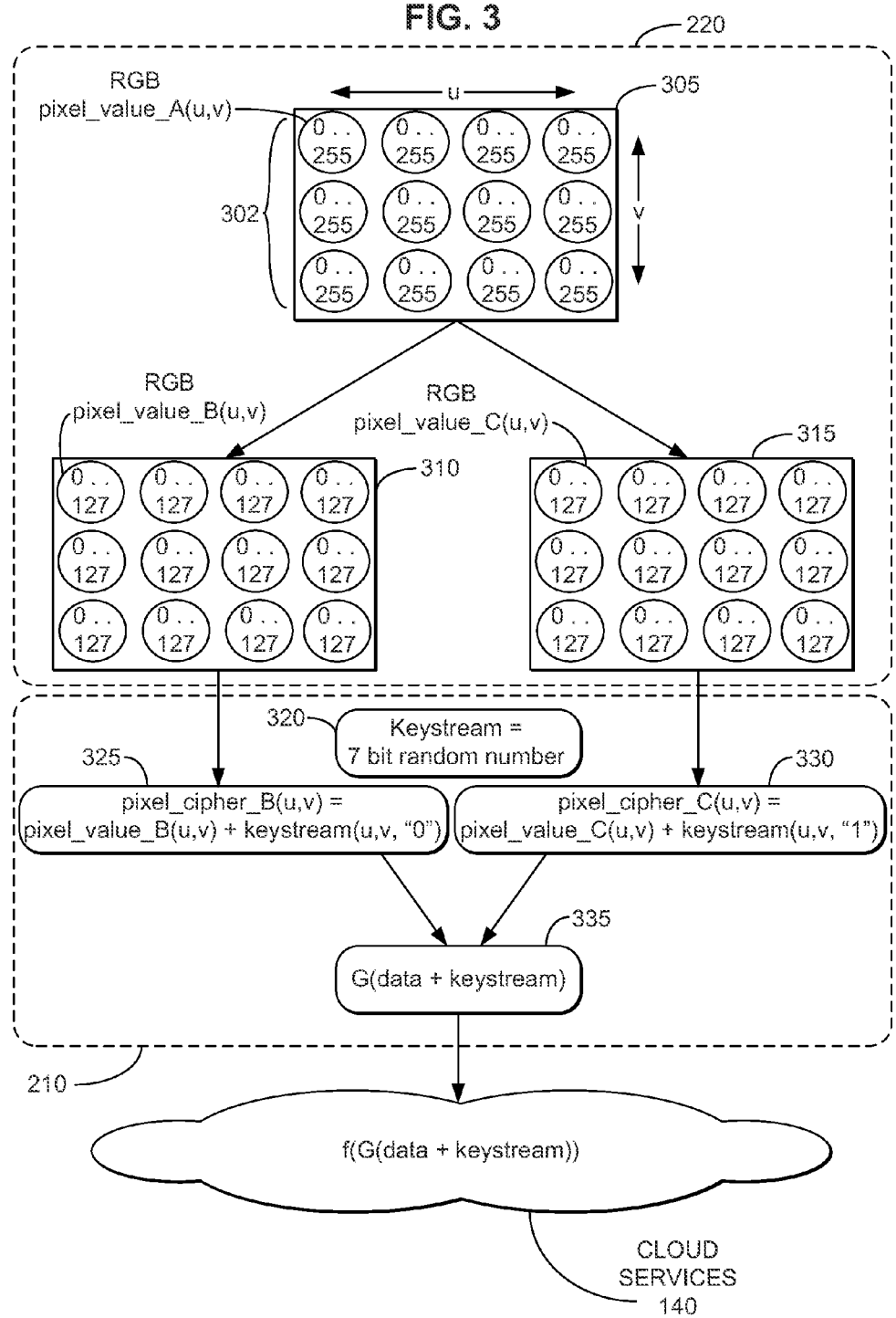

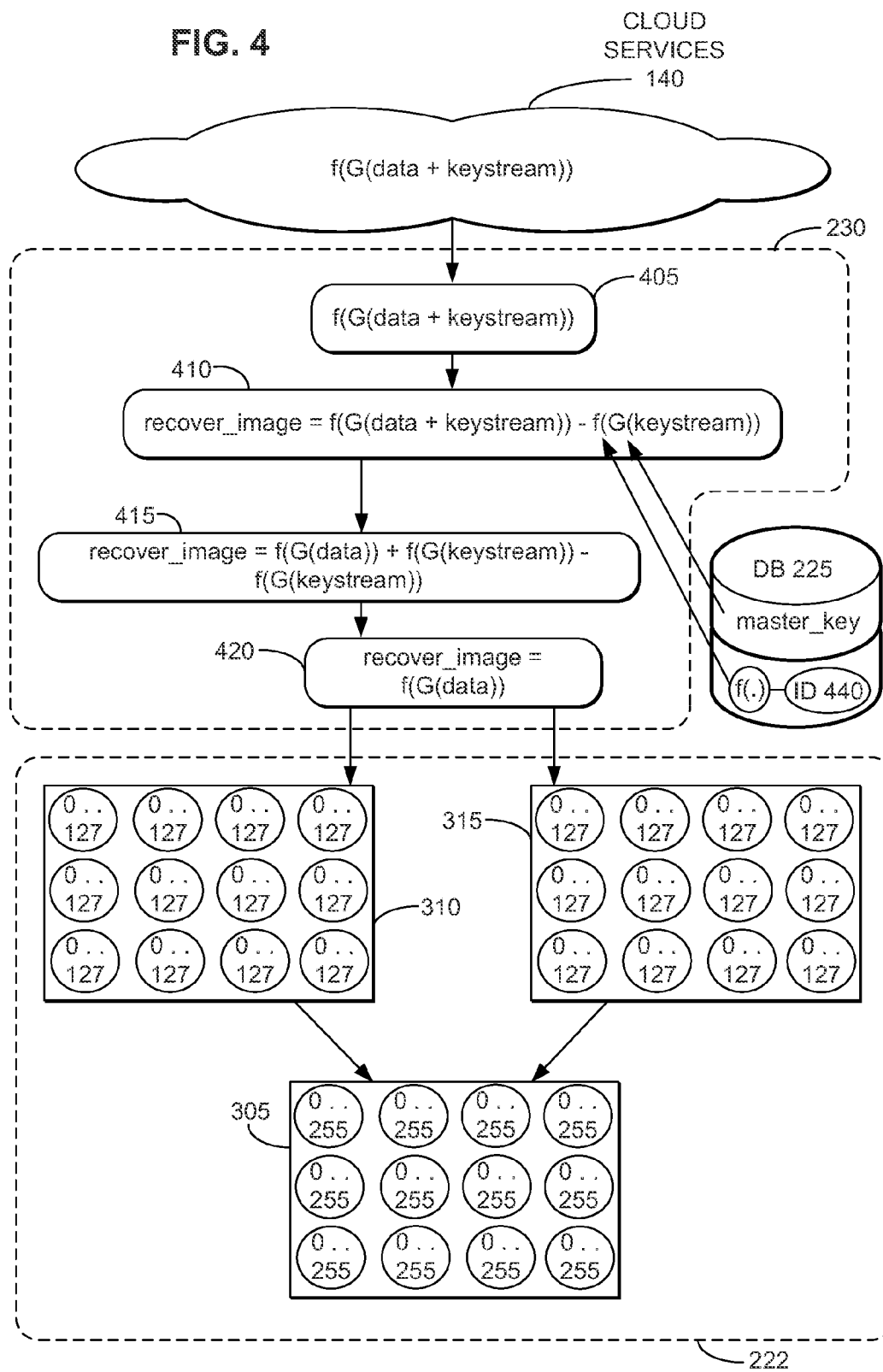

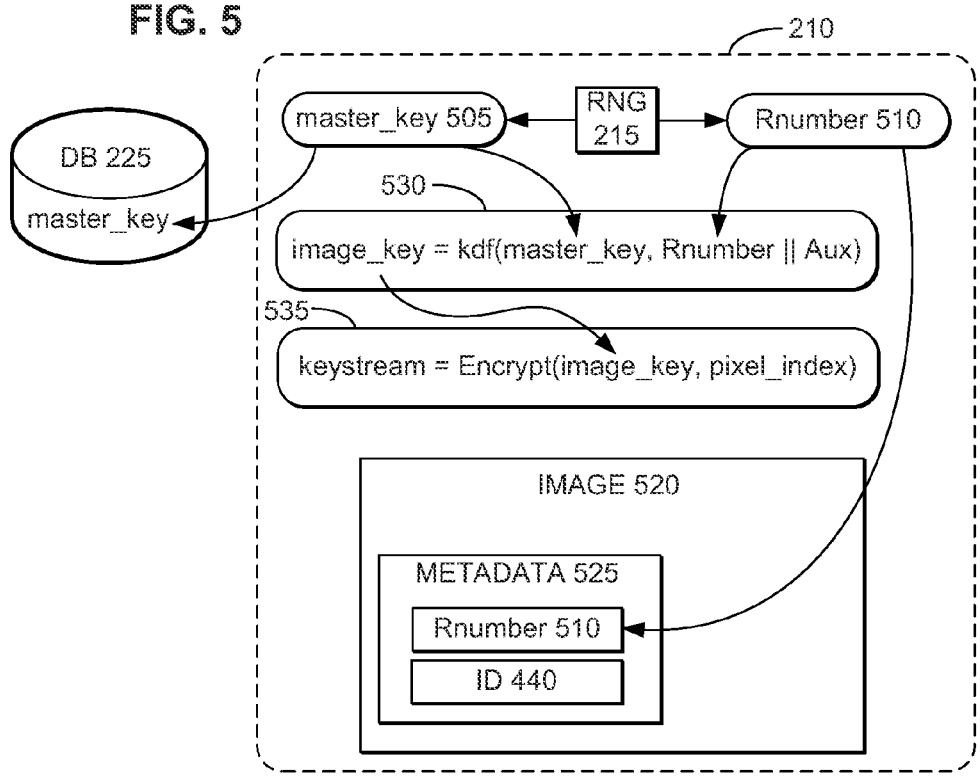
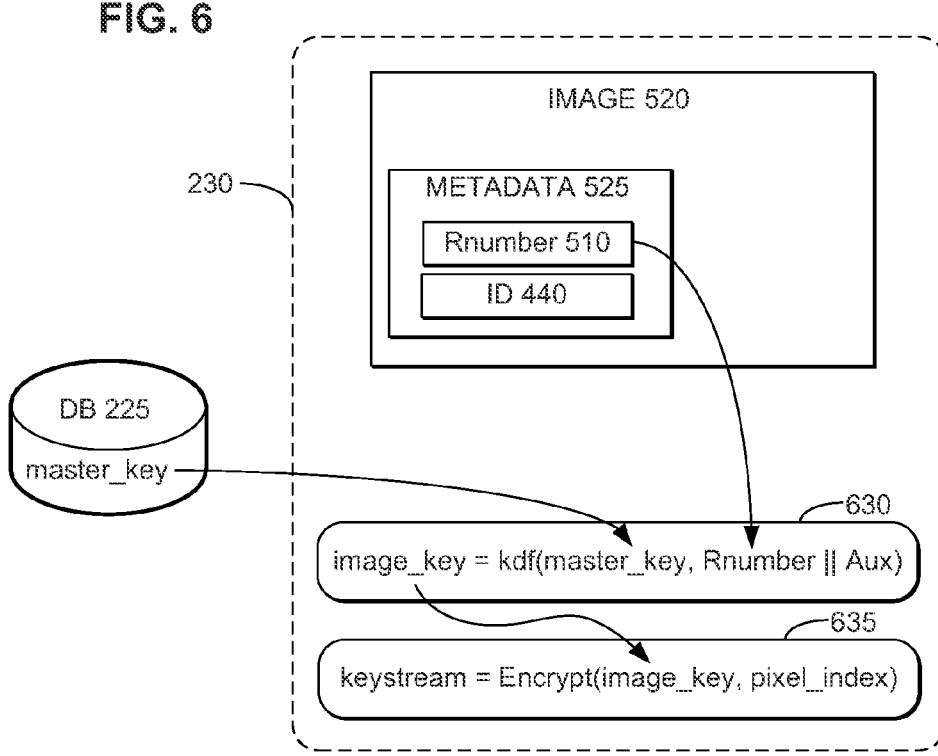

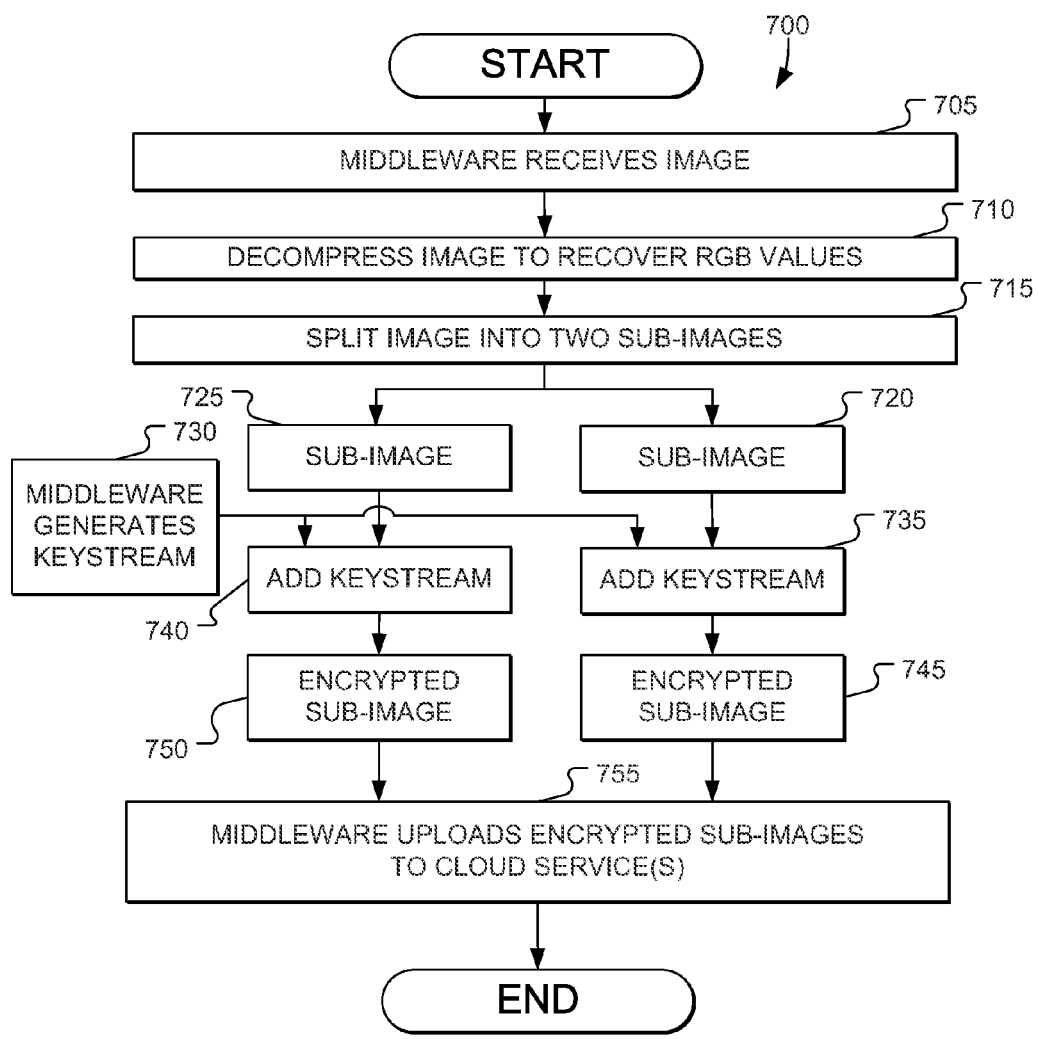

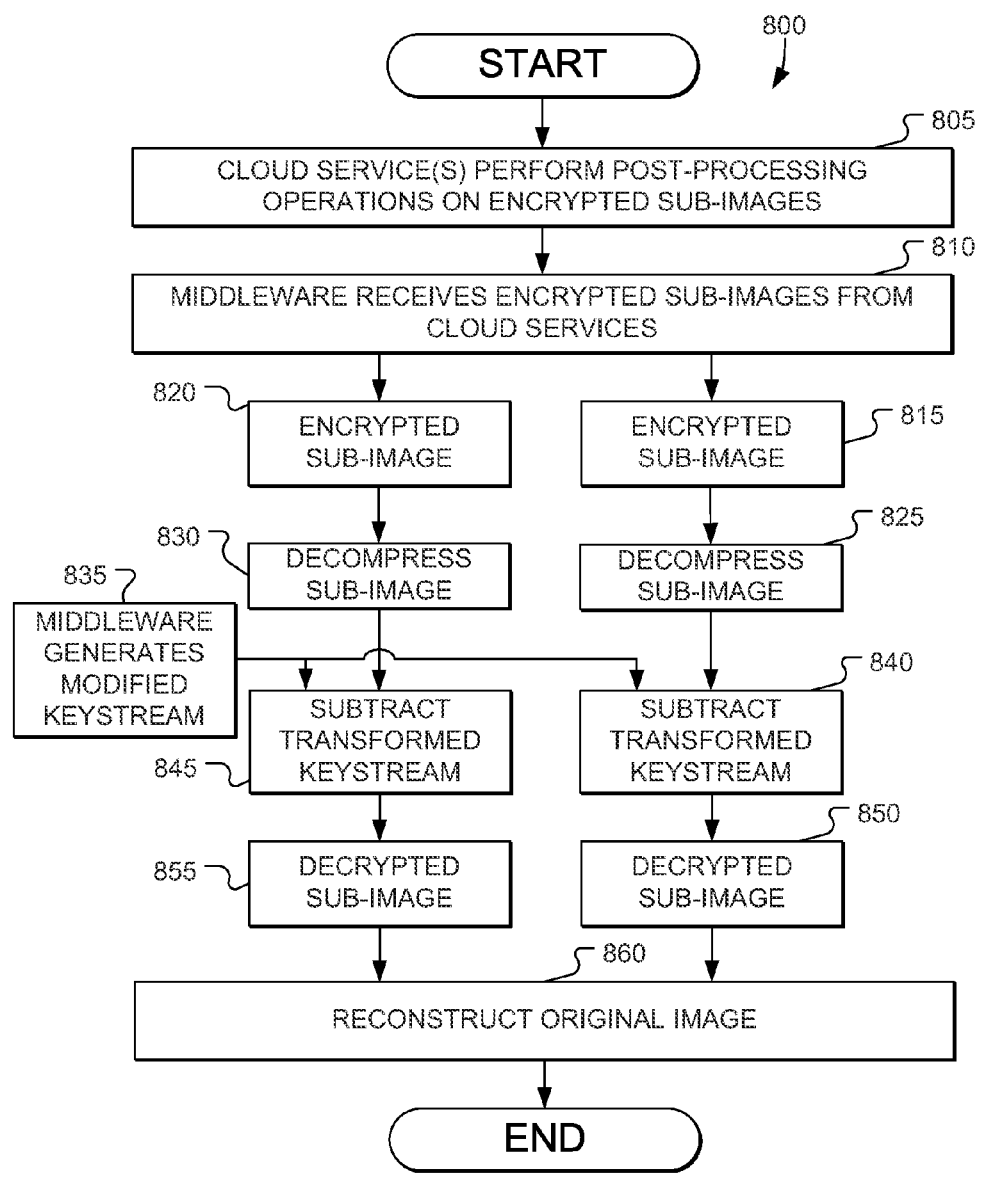

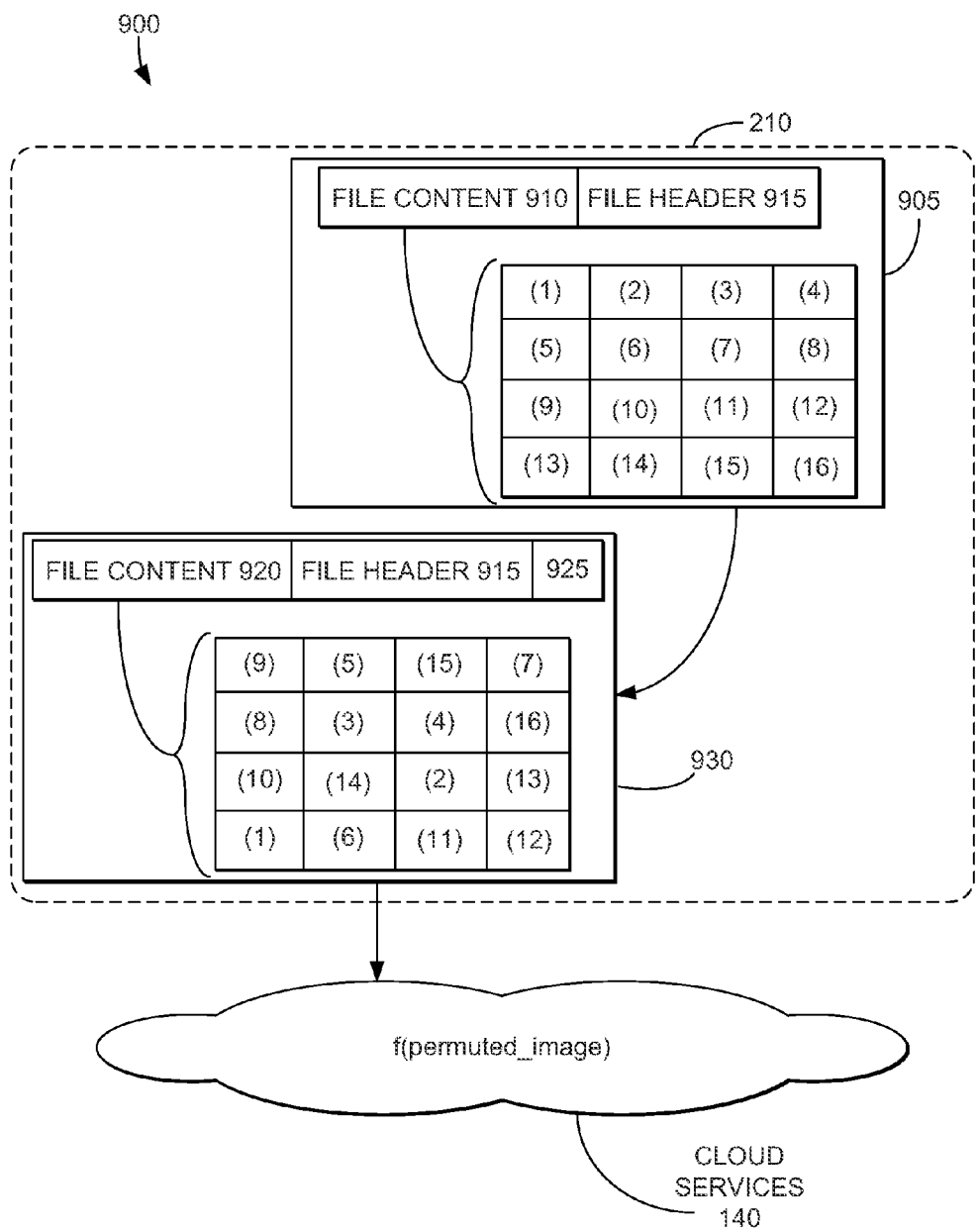

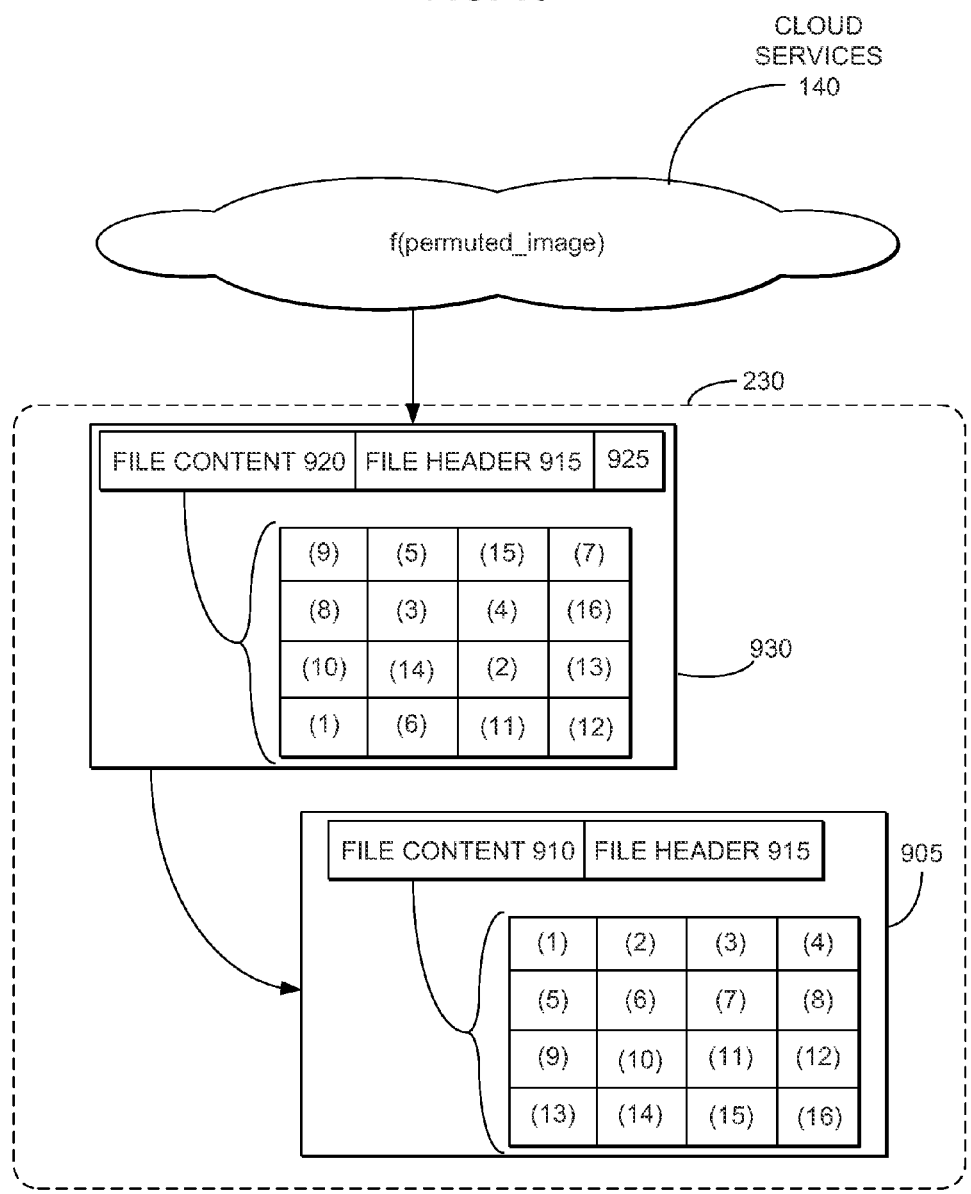

PRESERVING IMAGE PRIVACY WHEN MANIPULATED BY CLOUD SERVICES

TECHNICAL FIELD

Embodiments generally relate to image encryption, and more particularly, to preserving image privacy when the image is hosted or otherwise manipulated by cloud services such as photo-sharing websites.

BACKGROUND

Image processing and storage functions are rapidly being integrated into the cloud. Image uploading or photo-sharing is pervasive today, and ever expanding. Well-known sites such as Facebook®, Twitter®, Google Picasa®, Photobucket®, Flickr®, and the like, store billions of photos. With the explosive growth in image storage, privacy concerns have started to surface, with users concerned about the abuse of their personal data and photos, potentially from the sites themselves or from other unknown users.

Publicly available photos on service provider websites can be used to identify strangers in shopping malls, university campuses, or on public streets, for example, simply by performing facial recognition and matching the photos to names or other identifying information available on the websites of the service providers. There are increasingly more incidents of hackers comprising the databases of photo-sharing websites. The hacker or other bad actor may manipulate the content of the original image for nefarious reasons. Still other users can download or otherwise hack the photos, save them to external media, or upload them to other websites, with the original owner losing any measure of effective access control, thereby allowing anyone who comes into contact with the copies to have access to the original content.

FIG. 1 illustrates a conventional system in which hackers or others can gain access to photos. User application 105, which may be operated by a person 110, and can include a computer 115, a smart phone 120, a personal digital assistant (PDA) 125, or a camera 130, and so forth, may upload images 135 to cloud service 140. The user application 105 or other authorized person may later browse for the images at 165. However, a hacker 150, which may include a person 155 or a computer 160, or other unauthorized persons, and so forth, may gain access to the images 135 by accessing the cloud service 140 at 145.

Sometimes users scan sensitive documents into photos and stored them in photo-sharing sites, not understanding the ramifications of easy access by others. In other cases, users might want to only share certain photos with close family members or friends, or otherwise do not want the service provider to have access to the photo content. Conventional encryption technologies are ineffective because photo-sharing websites usually perform post-processing on the uploaded images, such as resizing, filtering, cropping, and so forth. Such post-processing operations change the values of the encrypted contents, and the subsequent decrypted contents will be completely garbled rather than revert to the original image content.

Another compounding factor is that the image compression algorithms commonly used today, such as Joint Photographic Experts Group (JPEG) images, have lossy compression algorithms including floating-point arithmetic errors and quantization loss, which are incompatible with standard encryption algorithms. Conventional xor approaches to encryption and keystreams break when the file contents are modified externally. Although full homomorphic encryption is more resilient to such operations, it is impractical today because encrypting just one bit can require megabytes of keys and hours of computation time for encryption and decryption of the photos.

It would be desirable to effectively and correctly decrypt an encrypted image stored and then retrieved from a photo-sharing website or other similar cloud service, particularly after post-processing operations are performed by the cloud service.

BRIEF DESCRIPTION OF THE DRAWINGS

Embodiments of the present invention are illustrated by way of example, and not by way of limitation, in the drawings and in which like reference numerals refer to similar elements.

FIG. 3 illustrates a flow diagram of aspects associated with the middleware of FIG. 2.

FIG. 4 illustrates a flow diagram of additional aspects associated with the middleware of FIG. 2.

FIGS. 5 and 6 illustrate block diagrams including a database associated with the middleware of FIG. 2.

FIG. 7 illustrates a flow diagram demonstrating a technique for encrypting and uploading images to a cloud service.

FIG. 8 illustrates a flow diagram demonstrating a technique for receiving and decrypting images from a cloud service.

FIG. 9 illustrates a flow and block diagram related to permutating and encrypting blocks of an image, according to another example embodiment of the present invention.

FIG. 10 illustrates a flow and block diagram related to decrypting the images of FIG. 9.

DETAILED DESCRIPTION

Reference will now be made in detail to embodiments of the invention, examples of which are illustrated in the accompanying drawings. In the following detailed description, numerous specific details are set forth to enable a thorough understanding of the present invention. It should be understood, however, that persons having ordinary skill in the art may practice the present invention without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first image could be termed a second image, and, similarly, a second image could be termed a first image, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of an apparatus and method for preserving image privacy when hosted or otherwise manipulated by cloud services, associated processes for using such apparatus, and associated systems with which such apparatus and method can be used, are described.

Figure 1:
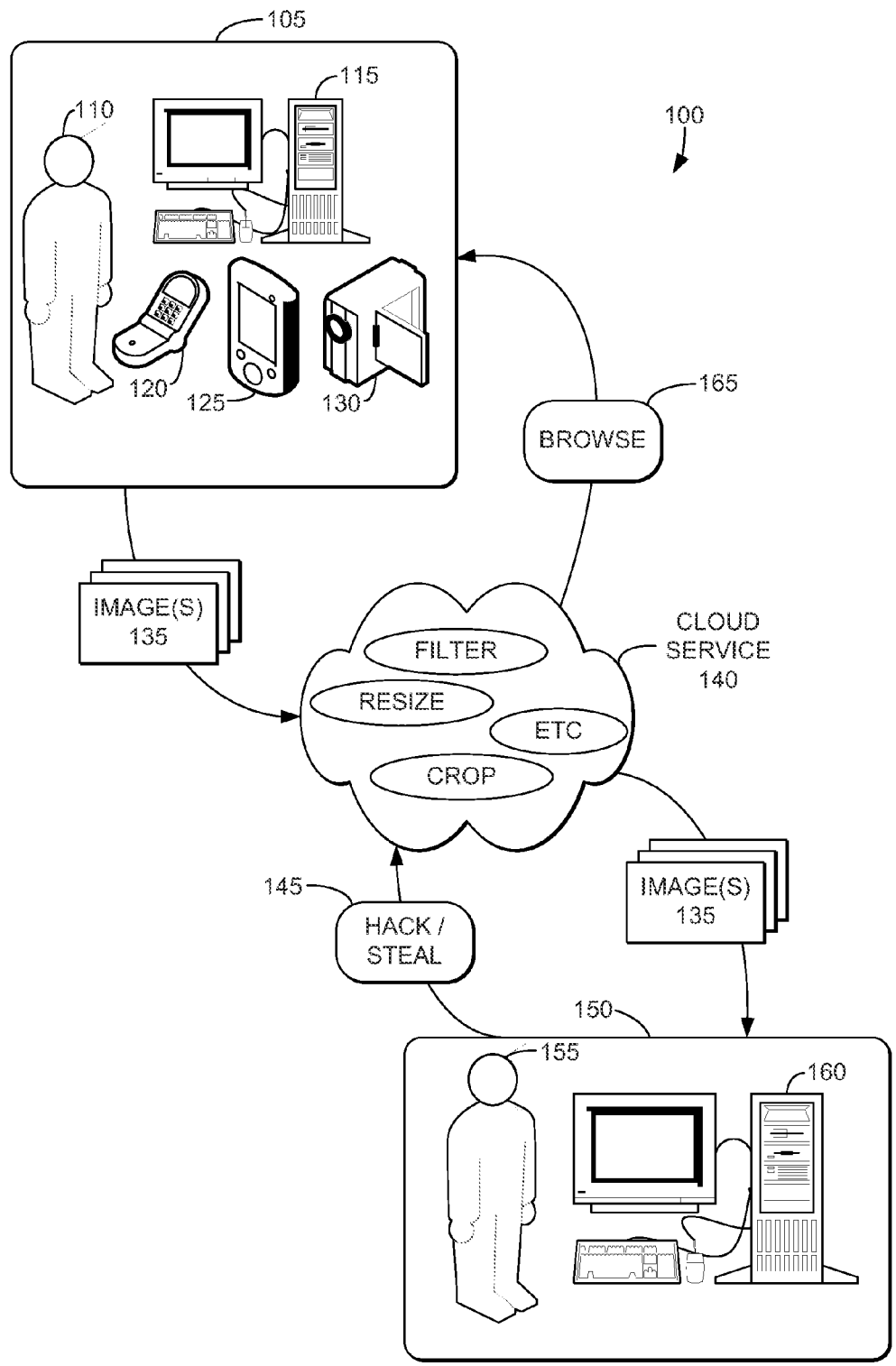
FIG. 1 illustrates a conventional system in which hackers or others can gain access to photos through a cloud service.
Figure 2:
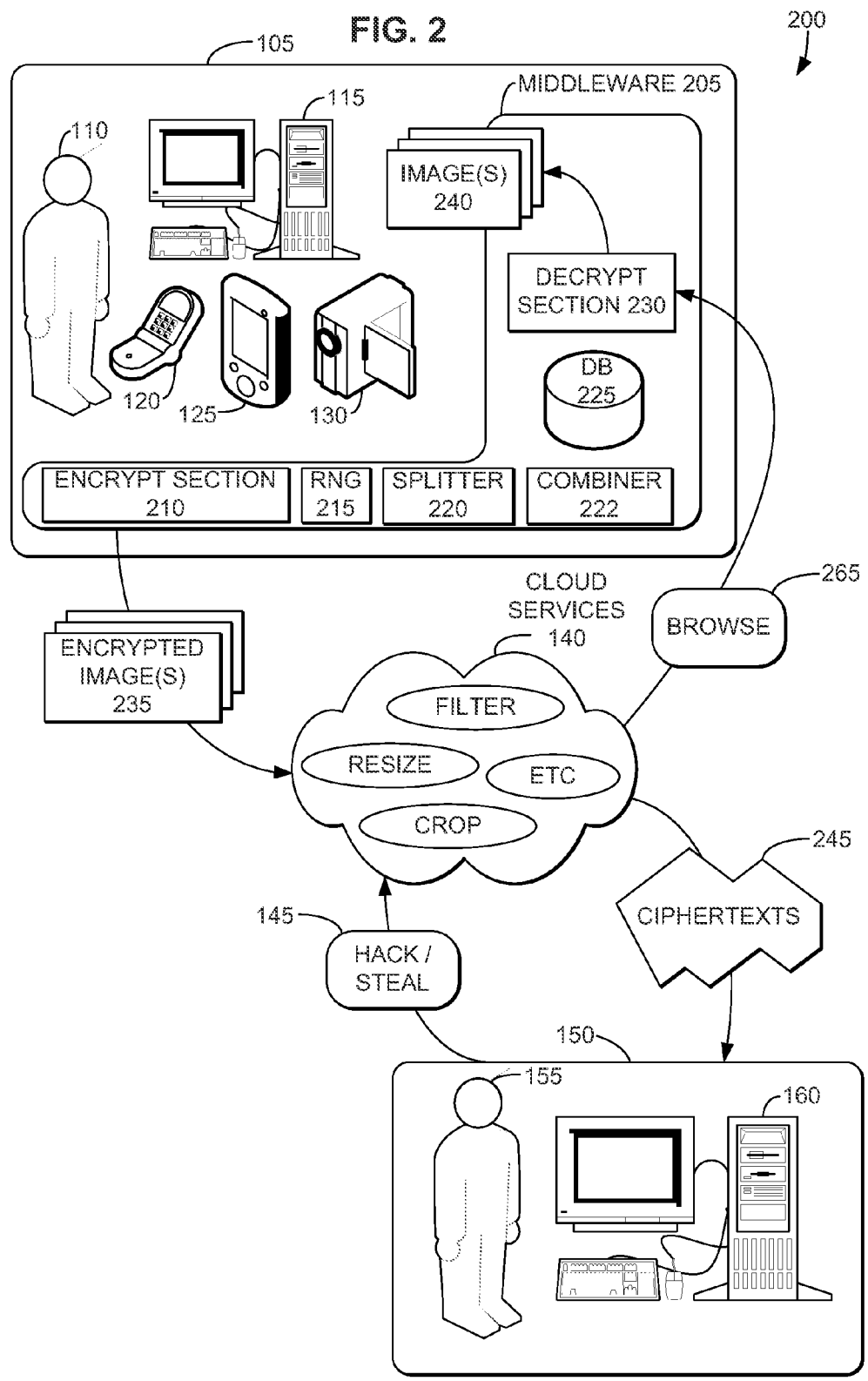
FIG. 2 illustrates a system including middleware for preserving the image privacy irrespective of image manipulations by the cloud service, according to an example embodiment of the present invention.

FIG. 2 illustrates a system 200 including middleware 205 for preserving image privacy irrespective of image manipulations by the cloud services 140, according to an example embodiment of the present invention. The user application 105 may be operated by a person 110, and can include a computer 115, a smart phone 120, a personal digital assistant (PDA) 125, or a camera 130, and an forth, which may upload encrypted images 235 to cloud service 140. The user application 105 can include or otherwise be associated with middleware 205. The middleware 205 and its components can be implemented in hardware, software, firmware, or any combination thereof.

The middleware 205 encrypts images using methods that are resilient to manipulations by the cloud services 140. The cloud services 140 can include, for example, social networks or photo storage sites, which typically resize, filter, crop, or otherwise reformat images, thereby causing conventional encryption techniques to be rendered inoperable. Embodiments of the present invention allows users to preserve the privacy of selected photos, upload those photos to any photo-sharing websites or other cloud services, and correctly decrypt the photos back to the original images regardless of the typical backend processing by the photo-sharing sites. Thus, there is no need to change the existing websites or cloud computing models. Moreover, encryption and decryption using embodiments disclosed herein are practical today and can be efficiently accomplished in less than a second for each photo.

As shown in FIG. 2, the middleware 205 transmits encrypted images 235 to the cloud services, so that if a hacker 150, which may include person 155 or computer 160, attempts to access the images, all that they would gain access to is the ciphertexts 245, and therefore would be unable to view the images. Authorized users, on the other hand, who have the appropriate middleware 205 and appropriate key, can browse the images at 265 and correctly decrypt the images 240 for later viewing, irrespective of the filtering, resizing, cropping, or other manipulations to the images by the cloud services 140.

The middleware 205 can receive an original image from the user 105. The middleware 205 includes a splitter 220, which can split the image into first and second sub-images, as described, in further detail below. The middleware 205 includes an encrypt section 210, which can encrypt the first and second sub-images, and produce first and second encrypted sub-images as also described in further detail below.

A random number generator (RNG) 215 is used to generate certain encryption keys, such as a master key to be stored, in database 225, and an image key to be stored in meta data of the image. After transmission of the first and second encrypted sub-images to the cloud services 140, and manipulation by the cloud services 140, the images can be received and decrypted by the middleware 205, which may be associated, with the same user application 105 or another authorized user application. The middleware 205 includes a decrypt section 230 to decrypt the first and second sub-images, and a combiner 222 to combine the first and second sub-images into substantially the original image.

FIG. 3 illustrates a flow diagram of aspects associated with the splitter 220 and the encrypt section 210 of FIG. 2. An original image 305 includes pixels 302. It will be understood that the image 305 can have any suitable number of pixels, and the enlarged pixels shown in the figures are merely for the purpose of illustration. Each pixel 302 includes an associated Red/Green/Blue (RGB) pixel value such as RGB pixel_value_A(u,v), where u is the row index and v is the column index for each pixel. Generally, RGB pixel values are 8 bits, which can represent between 0 and 255 different values or hues. It will be understood that the embodiments and inventive concepts described herein are applicable to 16 bit RGB pixel values, or any other suitable value. The splitter 220 can split the original image 305 into sub-image 310 and sub-image 315.

Each of the RGB pixel values of the sub-image 310, such as RGB pixel_value_B(u,v), will have a range between 0 and 127 different values or hues. Similarly, each of the RGB pixels values of the sub-image 315, such as RGB pixel_value_C(u,v), will have a range between 0 and 127 different values or hues. Such characteristics allow for a keystream to be added to the RGB pixel values of the sub-images without causing a mathematical carry, which would otherwise lead to negative or invalid results.

For each of the RGB pixel values of the sub-image 310, the encrypt section 210 adds a corresponding keystream value, such as keystream(u,v), which can be a 7 bit random number 320 generated for each RGB pixel value. For example, the following equation (1) as shown at 325 can be used:

$$\text{pixel\_cipher\_}B(u,v)=\text{pixel\_value\_}B(u,v)+\text{keystream}(u,v,\text{``0''}) \qquad (1)$$

Similarly, for each of the RGB pixel values of the sub-image 315, the encrypt section 210 adds a corresponding keystream value, such as keystream(u,v), which can be the 7 bit random number 320 generated for each RGB pixel value. For example, the following equation (2) as shown at 330 can be used:

$$\text{pixel\_cipher\_}C(u,v)=\text{pixel\_value\_}C(u,v)+\text{keystream}(u,v,\text{``1''}) \qquad (2)$$

The distinguishers "0" and "1" in the keystream( ) of equations (1) and (2), respectively, denote that the crypto keys are not repeated for different sub images, which increases the security guarantee. In other words, the pixel_cipher_B uses a different keystream from the pixel_cipher_C. The splitter 220 can first determine an RGB pixel value for each pixel of the original image, then divide each RGB pixel value of the original image into a first split RGB pixel value (e.g., RGB pixel_value_B(u,v)) and a second split RGB pixel value (e.g., RGB pixel_value_C(u,v)). Each split RGB pixel_value_B(u, v) can be associated with a corresponding RGB pixel value of the sub-image 310. Similarly, each split RGB pixel_value_C (u,v) can be associated with a corresponding RGB pixel value of the sub-image 315. The corresponding keystream(u,v) can then be added.

It will be understood that such operations can be performed on the coefficients and/or pixels associated with the image or any intermediate compression steps of the image. For instance, JPEG photos undergo several intermediate steps during compression, and splitting and encrypting aspects described herein can be performed on such a JPEG photo in connection with any intermediate or final steps associated with the JPEG compression, thereby reducing computation errors. The encrypt section 210 can therefore produce a first encrypted sub-image and a second encrypted sub-image, which together can be represented as G(data+keystream) as shown at 335.

The middleware 205 can transmit the G(data+keystream), including the first and second encrypted sub-images, to cloud services 140. The cloud services 140 can perform various post-processing functions, represented here as f(.), such as resize, crop, and filter.

FIG. 4 illustrates a flow diagram of additional aspects associated with the decrypt section 230 and combiner 222 of FIG. 2. The decrypt section 230 of the middleware 205 can receive the f(G(data+keystream)) at 405 from the cloud services 140. The decrypt section 230 can then decrypt the f(G(data+keystream)) to recover the original image. For each RGB pixel value of the first encrypted sub-image 310, the decrypt section 230 subtracts a corresponding reconstructed keystream value (e.g. f(G(keystream))). Similarly, for each RGB pixel value of the second encrypted sub-image 315, the decrypt section 230 subtracts a corresponding reconstructed keystream value (e.g., f(G(keystream))) selected from the plurality of modified keystream values. For example, the following equation (3) as shown at 410 can be used:

$$\text{recover\_image}=f(G(\text{data+keystream}))-f(G(\text{keystream})) \quad (3)$$

The G(keystream) can be modified by a predefined post-processing function f(.), which can be stored in database 225 and associated with a cloud service identifier (ID) 440. The database 225 can store multiple different post-processing functions associated with any number of different cloud services, each with its own ID. For example, if a photo-storage site is known to resize an image by a certain proportion, such function is stored in database 225 and identified by the associated site ID. Moreover, such post-processing functions can be determined based on experimental usage and analysis of the post-processing functions performed on images when subjected to the cloud service sites. The ID 440 can also be stored in the meta data of the image, as further described below.

The decrypt section 230 uses the master_key stored in the database 225 to generate the proper keystream, which together with the applied post-processing function f(.), results in f(G(keystream)). The f(G(keystream)) is used to decrypt the image data, as further shown at 410, 415, and 420. Further details regarding the master_key are provided below.

Almost all image processing algorithms have additive and homogeneity properties. Additivity is where f(x+y) is equivalent to f(x)+f(y). Homogeneity is where f(a*x) is equivalent to a*f(x), where a is the value of scalar. Because of these properties, as shown at 415, equation (3) can be re-written as equation (4) as follows:

$$\text{recover\_image}=f(G(\text{data}))+f(G(\text{keystream}))-f(G(\text{keystream})) \quad (4)$$

Equation (4) can be reduced, as shown at 420, to equation (5), as follows:

$$\text{recover\_image}=f(G(\text{data})) \quad (5)$$

The recovered image (i.e., recover_mage) corresponds to decrypted sub-images 310 and 315. The decrypted sub-images can be combined by the combiner 222 into substantially the original image 305.

FIGS. 5 and 6 illustrate block diagrams including a database 225 associated with the middleware 205 of FIG. 2. The encrypt section 210 can produce a master_key 505, which is stored in the database 225. More specifically, the RNG 215 can produce the master_key 505, which is preferably a 256-bit cryptographically strong random number. In addition, for each image, the RNG 215 can produce a random number (i.e., Rnumber 510), which is used to generate an image_key. The Rnumber 510 can be embedded in the metadata 525 of the image 520, and is preferably a 128-bit random number. The metadata 525 can also store the ID 440, which is described above.

The keystream can be generated, by either or both of the encrypt section 210 and the decrypt section 230, using at least the master_key 505, as shown in both FIGS. 5 and 6. For example, as shown at 535 and 635, the following function (6) can be used to generate the keystream:

$$\text{keystream}=\text{Encrypt}(\text{image\_key},\text{pixel\_index}) \quad (6)$$

As set forth in (6), the Encrypt(.) function can be Advanced Encryption Standard (AES) cipher or any other suitable encryption algorithm. The pixel_index corresponds to the (u,v) pixel index location of the image. The image_key is used to guarantee that each instance of an image will have distinct keystream based upon the image_key that is derived in (7), as further set forth below. In other words, the keystream values discussed above are generated using the image_key and the pixel_index.

The image_key can be generated, by either or both of the encrypt section 210 and the decrypt section 230, using at least the Rnumber 510, as shown at 530 of FIG. 5 and at 630 of FIG. 6, according to the following function (7):

$$\text{image\_key}=\text{kdf}(\text{master\_key},R\text{number}||\text{Aux}) \quad (7)$$

As set forth in (7), the kdf(.) function can be a standard key derivation function, either cipher or hash-based. The Aux can correspond to auxiliary data, such as for security purposes.

The encrypt section 210 of the middleware 205 can encrypt the image using (6) and/or (7). Likewise, the decrypt section 230 of the middleware 205 can decrypt the image using (6) and/or (7). As the middleware 205 is the only entity capable of producing the keystream, only the middleware 205 having the master_key 505 can decrypt the images.

FIG. 7 illustrates a flow diagram 700 of a technique for encrypting and uploading images to a cloud service(s). The technique begins at 705, where the middleware receives an image from a user or user application. At 710, the image is decompressed to recover RGB pixel values. At 715, the image is split into two sub-images. The number of bits associated with each RGB pixel value of sub-image 725 and sub-image 720 is less than the number of bits associated with each RGB pixel value of the original image. At 730, the middleware generates a keystream, which is added to the sub-images at 740 and 735, as explained in detail above. Image compression can be performed after or during the adding of the keystream. The encrypted sub-images at 750 and 745 are uploaded by the middleware to the cloud service(s) at 755.

FIG. 8 illustrates a flow diagram 800 of a technique for receiving and decrypting images from a cloud service. At 805, the cloud service(s) perform post-processing operations on the encrypted sub-images. At 810, the middleware receives the encrypted sub-images from the cloud service(s). At 820 and 815, the encrypted sub-images are made ready for decryption by the decrypt section of the middleware. At 830 and 825, the sub-images are decompressed using image decompression algorithms such as JPEG. At 835, the middleware generates the modified keystream, as explained in detail above, and the modified keystream is subtracted from the sub-images at 845 and 840, either during or after the decompression. The flow proceeds to decrypted sub-images at 855 and 850, which are recombined or otherwise reconstructed into the original image at 860.

FIG. 9 illustrates a flow and block diagram 900 related to permutating and encrypting blocks (e.g., (1), (2), ... , (16)) of an image 905, according to another example embodiment of the present invention. FIG. 10 illustrates a flow and block diagram related to decrypting the image 905 of FIG. 9. Reference is now made to FIGS. 9 and 10.

Blocks of the image 905 can be defined to have a particular size, or otherwise divided into N blocks, each block including some number of pixels. For example, an image with 2048 by 1024 pixels can have the block size defined as 64 by 64 pixels. In such case, the total number of blocks will be 512. The encrypt section 210 can select a permutation from a factorial of N permutations. In other words, the encrypt section 210 can permutate the blocks in 512! (factorial of 512) number of different ways, which is even larger than $2^{512}$. Put differently, the encrypt section 210 can then permutate the N blocks of the image based on the selected permutation.

Based on the secret key 925, which can be stored in or otherwise associated with the file header 915 of the image 905, the middleware 205 can choose only one out of all possible 512! (factorial of 512) possibilities, which is practically infeasible for any third party, without the secret key 925, to guess correctly. This is quite different from, for example, a jigsaw puzzle where there is only one final pattern and pieces include various shapes to help with the orientation. The permutation causes the file content 910 of image 905 to be scrambled into the file content 920 of the permutated image 930. There is no clue that is available to human users on how to reconstruct the orientations. The middleware 205 can then upload the permutated image 930 to the cloud service(s) 140, which can perform post-processing functions (e.g., f(.)) on the permutated image.

As shown in FIG. 10, the permutated image is then received, from the cloud service(s) 140 and decrypted using the decrypt section 230. For example, the decrypt section 230 can use the secret key 925 to decrypt the permutation and return the file contents 920 of the permutated image 930 back to substantially the file contents 910 of the original image 905.

More specifically, the secure permutation can be performed by generating a keystream and by using the secret key 925 and a stream cipher F(.). The encrypt section 210 can receive an image having a size (e.g., height×width). A predefined block size M can be used. The encrypt section 210 can also receive and/or generate the secret key 825, the stream cipher F(.), and a key derivation function (e.g., kdf(.)). The encrypt section 210 can output instance_randomH and a permutated image.

The following are example elements of this approach:

1. Generate an index for the blocks; e.g., a[0]=0, a[1]=1, . . . a[N]=N.
2. For every instantiation of middleware to encrypt a photo by permutation, generate a random number H (e.g., 128-bit), referred to herein as instance_randomH.
3. instance_key=kdf(K, H), where K is the secret key 925. Each instance_key can be a distinct key to augment the security.
4. keystream F(instance_key, counter), where counter can increase from 0.
5. keystream is a bit stream (e.g., 1000111111110). Number u can be selected, where $2^u$ is the least integer that is greater than N. Every $2^u$ bits of keystream can be a partition or unit. For example: u=3→keystream[0]=100, keystream[1]=011, and so forth.
6. for j from N down to 2
   a. $d_j$=keystream[j] modulo N. (e.g., swap position is determined by stream cipher)
   b. swap a[$d_j$] and a[j−1]
7. endfor
8. Permute the blocks of the image according to a[j], for j from 0 to N According to above algorithm, the encrypt section 210 can permute the blocks of the image. The decrypt section 230 can gain access to the secret key K (e.g., 925) and the private hint H (i.e., instance_randomH) to generate the permutation sequence. The permutation can then be reversed and the original image reconstructed. The stream cipher F(.) and the derivation function kdf(.) can be public, and H is a random number used as the instance identifier.

Put differently, methods disclosed herein include selecting a permutation from a factorial of N permutations. A keystream can be generated. The N blocks can be permutated based on the keystream and the selected permutation. Each of the N blocks can be swapped with another of the N blocks based on the keystream. N swap positions can be determined. For example, the swap position can be based on keystream[j] modulo N, where j is an index into the keystream. The index j can be decremented from N down to 2. Each of the N blocks can be swapped with another of the N blocks located at the swap position.

Figure 11:
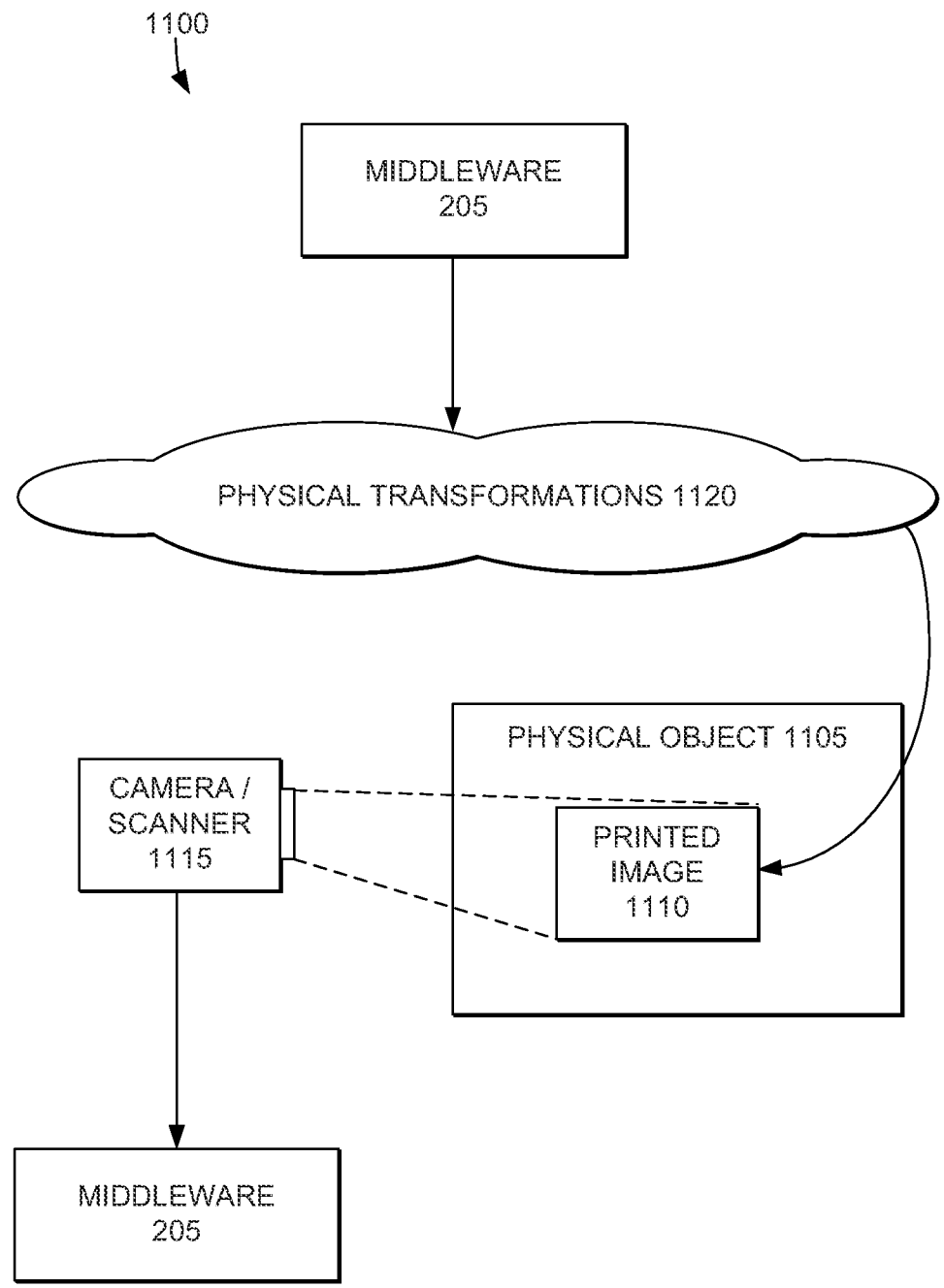
FIG. 11 illustrates a block diagram of a physical object having affixed thereto an encrypted printed image, according to yet another example embodiment of the present invention.

FIG. 11 illustrates a block diagram 1100 of a physical object 1105 having affixed thereto an encrypted printed image 1110, according to yet another example embodiment of the present invention.

The middleware 205 can encrypt an image using one or more of the techniques described. In detail above. The image can then be physically transformed, as shown at 1120. The physical transformations can include resizing, scaling, compressing, cropping, and so forth, and can be performed on the encrypted image electronically and/or on physical printed media. The image can be printed on physical media, thereby resulting in a printed image 1110. The printed image 1110 is scrambled or otherwise undecipherable without the appropriate decryption algorithm and keys. Hackers or other adversaries are therefore prevented from interpreting the printed image 1110. Unlike a barcode, which can be easily intercepted and interpreted by hackers or other third parties, the encrypted image allows information to be securely transmitted in the physical non-electronic world. The printed image can be affixed to a physical object 1105. The physical object can be, for example, a package, a sign, paper, a display, a magazine, a newspaper, and the like. The physical object can also be a screen or a display, such as a move screen, a TV screen, a computer display, a phone display, or the like.

The printed image 1110 can be photographed or scanned using, for example, a camera and/or scanner 1115. In other words, a digital image can be captured of the printed image 1110. The middleware 205 can decrypt the digital image, using one or more of the techniques described in detail above. The decryption algorithm can reconstruct the original image, or at least an approximate of the original image, because the middleware 205 has access to the master key and the other components and algorithms for decrypting the photographed or scanned image, notwithstanding the physical transformations 1120 of the encrypted image.

In this manner, images can be covertly transmitted, using a form of visual cryptography, which can be used for advertising, subscription services, audience selection, games, secure social networking, among other possibilities. For example, images can be privately or covertly transmitted from middleware, to a physical object, then to an endpoint such as the same or different middleware. Thus, the image can remain confidential or private, even when exposed to external physical world scenarios.

Although particular embodiments have been described, it will be appreciated that the principles of the invention are not limited to those embodiments. Embodiments include middleware for uploading encrypted image data to websites (e.g., social media and/or cloud services) using the lossy data formats already accepted by the backend services using a new loss-resilient encryption algorithm. The resilient encrypted image cipher text can be manipulated by the back end cloud services (e.g., compressed, cropped, transformed, filtered, etc.), yet the approximate original image can still be restored given the ciphertext and a secret decryption key used by authorized parties.

The encrypted image can be downloaded, copied, moved, manipulated and uploaded to other websites while remaining secure (i.e., encrypted) so only parties with the correct key can decrypt the image and restore the approximate original using one or more of the resilient encryption algorithms disclosed herein. Specialized hardware or hardware accelerators can be used to accelerate the resilient cryptographic algorithms. The middleware can be included within general purpose computers, tablets, smart phones, ultrabooks, servers, or the like. Embodiments disclosed herein enhance image and media privacy, allowing manipulation of ciphertext, while providing the ability to recover the original plaintext content.

In some embodiments, an article drawn from the set of media including floppy disks, optical disks, fixed disks, volatile memory, non-volatile memory, random access memory, read-only memory, or flash memory, comprising a machine-accessible medium having associated non-transitory instructions that, when executed in a test and measurement device, results in a machine performing the steps of the various embodiments of the invention as disclosed herein. Other variations and modifications may be made without departing from the principles of the invention as set forth in the following claims.

What is claimed is:

1. A method operating on a processor for preserving image privacy by encrypting an original image for later storage on a publically accessible storage facility, comprising:
    receiving the original image;
    splitting the original image into first and second sub-images, each of the first and second sub-images having a same number of pixels as the original image;
    for each of a plurality of pixel values of the first sub-image, adding a first corresponding keystream value selected from a plurality of keystream values;
    producing a first encrypted sub-image;
    for each of a plurality of pixel values of the second sub-image, adding a second corresponding keystream value selected from the plurality of keystream values, the second corresponding keystream value different than the first corresponding keystream value;
    producing a second encrypted sub-image; and
    storing the first encrypted sub-image and the second encrypted sub-image as data for transmission to the publically accessible storage facility.

2. The method of claim 1, wherein the pixel values are Red/Green/Blue (RGB) pixel values, and wherein splitting further comprises:
    determining an RGB pixel value for each of a plurality of pixels of the original image;
    dividing each RGB pixel value of the original image into a first split RGB pixel value and a second split RGB pixel value;
    associating each of the first split RGB pixel values with a corresponding RGB pixel value of the first sub-image; and
    associating each of the second split RGB pixel values with a corresponding RGB pixel value of the second sub-image.

3. The method of claim 1, in which transmission to the publically accessible storage facility comprises
    transmitting the first and second encrypted sub-images to a cloud service.

4. The method of claim 1, wherein the pixel values are RGB pixel values, the method further comprising:
    receiving the first and second encrypted sub-images from the cloud service;
    for each RGB pixel value of the first sub-image, subtracting a corresponding modified keystream value selected from a plurality of modified keystream values;
    producing a first decrypted sub-image;
    for each RGB pixel value of the second sub-image, subtracting a corresponding modified keystream value selected from the plurality of modified keystream values; and
    producing a second decrypted sub-image.

5. The method of claim 4, further comprising:
    combining the first and second decrypted sub-images into the original image or a reconstructed version of the original image.

6. The method of claim 4, further comprising:
    producing a master key;
    storing the master key in a database;
    generating the plurality of keystream values using at least the master key;
    modifying the plurality of keystream values according to a predefined post-processing function, thereby producing the plurality of modified keystream values.

7. The method of claim 6, further comprising:
    producing a random number using a random number generator;
    storing the random number in metadata of at least one of the first and second sub-images; and
    generating an image key using at least the random number.

8. The method of claim 6, further comprising:
    associating the predefined post-processing function to an identifier of a cloud service;
    storing the identifier in metadata of at least one of the first and second sub-images; and
    identifying the predefined post-processing function using the identifier.

9. The method of claim 1, wherein the original image is formed of a number of pixels with an n-bit depth, and wherein at least the first sub-image has a bit depth less than the n-bit depth.

10. The method of claim 9, wherein the first sub-image has a bit depth of n−1.

11. The method of claim 9, wherein the first keystream value is a number having a length of n−1 bits.

12. A middleware processor for encrypting an original image for later storage on a publically accessible storage facility, comprising:
    a computer hardware assisted splitter configured to split an original image into first and second sub-images, the first and second sub-images having a same number of pixels as the original image;
    a computer hardware assisted encrypter configured to:
        add each of a plurality of pixel values of the first sub-image to a first corresponding keystream value selected from a plurality of keystream values;

produce a first encrypted sub-image;
add each of a plurality of pixel values of the second sub-image to a second corresponding keystream value selected from the plurality of keystream values, the second corresponding keystream value different than the first corresponding keystream value; and
produce a second encrypted sub-image: and
a physical memory for receiving and storing the first encrypted sub-image and the second encrypted sub-image as data.

13. The middleware processor of claim 12, wherein the pixel values are Red/Green/Blue (RGB) pixel values, and wherein the splitter is further configured to:
determine an RGB pixel value for each of a plurality of pixels of the original image;
divide each RGB pixel value of the original image into a first split RGB pixel value and a second split RGB pixel value;
associate each of the first split RGB pixel values with a corresponding RGB pixel value of the first sub-image; and
associate each of the second split RGB pixel values with a corresponding RGB pixel value of the second sub-image.

14. The middleware processor of claim 12, wherein the middleware is configured to transmit the first and second encrypted sub-images to a cloud service.

15. The middleware processor of claim 12, wherein the pixel values are RGB pixel values, the apparatus further comprising:
a decrypt section configured to:
subtract a modified keystream value, selected from a plurality of modified keystream values, from each RGB pixel value of the first sub-image;
produce a first decrypted sub-image;
subtract a modified keystream value, selected from the plurality of modified keystream values, from each RGB pixel value of the second sub-image; and
produce a second decrypted sub-image; and
a combiner configured to combing the first and second decrypted sub-images into substantially the original image.

16. The middleware processor of claim 12, further comprising:
a random number generator configured to produce a master key; and
a database configured to store the master key,
wherein the encrypt section is configured to generate the plurality of keystream values based on at least the master key.

17. The middleware processor of claim 12, further comprising:
a random number generator configured to produce a random number storable in metadata of at least one of the first and second sub-images; and
an image key based on at least the random number.

18. One or more tangible computer-readable media storing non-transitory computer-executable instructions that, when executed by a processor, operate to perform a method for preserving image privacy by encrypting an original image for later storage on a publically accessible storage facility, the method comprising:
receiving the original image;
splitting the original image into first and second sub-images, each of the first and second sub-images having a same number of pixels as the original image;
for each of a plurality of pixel values of the first sub-image, adding a first corresponding keystream value selected from a plurality of keystream values;
producing a first encrypted sub-image;
for each of a plurality of pixel values of the second sub-image, adding a second corresponding keystream value selected from the plurality of keystream values, the second corresponding keystream value different than the first corresponding keystream value;
producing a second encrypted sub-image; and
storing the first encrypted sub-image and the second encrypted sub-image as data for transmission to the publically accessible storage facility.

* * * * *